(12) United States Patent
Shintaku

(10) Patent No.: US 9,995,608 B1
(45) Date of Patent: Jun. 12, 2018

(54) PITOT-STATIC TESTER KIT

(71) Applicant: Brent Shintaku, Yelm, WA (US)

(72) Inventor: Brent Shintaku, Yelm, WA (US)

( * ) Notice: Subject to any disclaimer, the term of this patent is extended or adjusted under 35 U.S.C. 154(b) by 46 days.

(21) Appl. No.: 15/270,141

(22) Filed: Sep. 20, 2016

(51) Int. Cl.
*G01F 1/46* (2006.01)

(52) U.S. Cl.
CPC ..................... *G01F 1/46* (2013.01)

(58) Field of Classification Search
None
See application file for complete search history.

(56) References Cited

U.S. PATENT DOCUMENTS

| | | | |
|---|---|---|---|
| 2,554,634 A | 5/1951 | Paine | |
| 3,518,870 A | 7/1970 | Scharringhausen | |
| 4,384,469 A * | 5/1983 | Murphy | G01F 25/0007 73/1.29 |
| D269,617 S | 7/1983 | Nippert | |
| 5,026,001 A | 6/1991 | Wright | |
| 5,559,279 A * | 9/1996 | Traina | G01F 1/46 702/100 |
| 5,736,651 A * | 4/1998 | Bowers | G01F 1/46 73/861.66 |
| 6,585,943 B1 * | 7/2003 | Sanford | A61B 1/123 134/200 |
| 7,581,426 B2 | 9/2009 | Gilday | |
| 7,764,570 B2 | 7/2010 | Perez | |
| 2013/0247674 A1 * | 9/2013 | Grenning | G01F 1/88 73/700 |
| 2015/0132860 A1 * | 5/2015 | Cook | G01N 35/1079 436/501 |

FOREIGN PATENT DOCUMENTS

CA 2535577 A1 8/2013

* cited by examiner

*Primary Examiner* — Harshad R Patel

(57) ABSTRACT

The pitot-static tester kit is adapted for use with pitot based measurement equipment. The pitot-static tester kit tests the static pressure pitot static tube for leaks in situ. The pitot-static tester kit is a kit that simultaneously tests the pitot tube and the hose of a tube assembly selected from the group consisting of the stagnation pressure pitot static tube assembly and the static pressure pitot static tube assembly. The selected tube assembly is placed under pressure from an externally provided test set and the pitot-static tester kit then tests the pitot tube and the hose of a selected tube assembly for leaks. The pitot-static tester kit comprises a first adapter plug, a second adapter plug, a cleaning medium, a surfactant solution, a flashlight, and a cloth.

14 Claims, 3 Drawing Sheets

PITOT-STATIC TESTER KIT

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

The present invention relates to the field of measurement and instrumentation, more specifically, a method for testing the operation a flow volume measuring device.

The measurement of the volume and the speed of the flow of gas is a function of the dynamic pressure of the gas flow. While a method to directly measure the dynamic pressure is not known in the art, it is known that that the dynamic pressure is the difference between the stagnation pressure of the gas flow and the static pressure of the gas flow. Therefore, current technologies measure dynamic pressure by measuring the stagnation pressure and the static pressure of the gas flow and using the difference to estimate the dynamic pressure. Current technology to measure the stagnation pressure and the static pressure comprises the use of separate pitot tubes to capture a sample of the gas flow as it passes a point and to measure the pressure of the captured gas using a pressure sensor.

The measurement of the volume and speed of gas flow is a critical parameter in many industries and failures of pitot based systems to accurately measure the stagnation pressure or the static pressure of a gas flow has in the past resulted in a plurality of unfortunate events. In many critical systems the procedures for checking pitot based measurement equipment often require the pitot based measurement equipment: 1) to be removed; to be bench tested using a pressure pump to inspect the pitot based measurement equipment for leaks; and then, 3) reinstalled after testing is completed.

Clearly, a reliable method to test pitot based measurement equipment without requiring removal from the equipment would be of benefit.

SUMMARY OF INVENTION

The above need is addressed in this disclosure

The pitot-static tester kit is adapted for use with pitot based measurement equipment. The pitot-static tester kit is adapted for use with a stagnation pressure pitot static tube assembly. The pitot-static tester kit is adapted for use with a static pressure pitot static tube assembly. The stagnation pressure pitot static tube assembly is further defined with a stagnation pressure pitot tube and a stagnation pressure hose. The static pressure pitot static tube assembly is further defined with a static pressure pitot tube and a static pressure hose. The pitot-static tester kit tests the stagnation pressure pitot static tube for leaks in situ. The pitot-static tester kit tests the static pressure pitot static tube for leaks in situ. The pitot-static tester kit is a kit that simultaneously tests the pitot tube and the hose of a tube assembly selected from the group consisting of the stagnation pressure pitot static tube assembly and the static pressure pitot static tube assembly. The selected tube assembly is placed under pressure from an externally provided test set and the pitot-static tester kit then tests the pitot tube and the hose of a selected tube assembly for leaks.

These together with additional objects, features and advantages of the pitot-static tester kit will be readily apparent to those of ordinary skill in the art upon reading the following detailed description of the presently preferred, but nonetheless illustrative, embodiments when taken in conjunction with the accompanying drawings.

In this respect, before explaining the current embodiments of the pitot-static tester kit in detail, it is to be understood that the pitot-static tester kit is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the pitot-static tester kit.

It is therefore important that the claims be regarded as including such equivalent construction insofar as they do not depart from the spirit and scope of the pitot-static tester kit. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
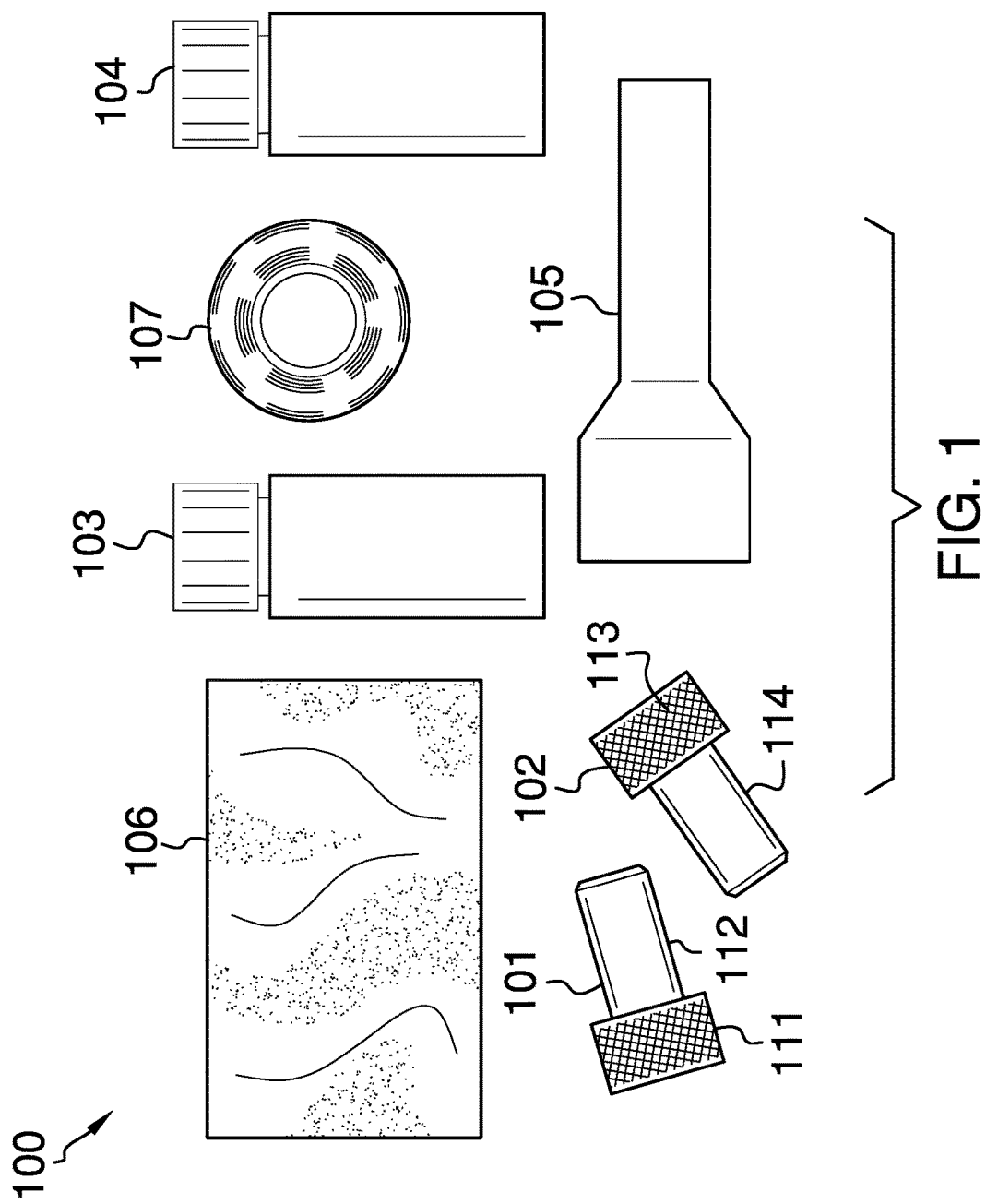
FIG. 1 is a kit view of an embodiment of the disclosure.
Figure 2:
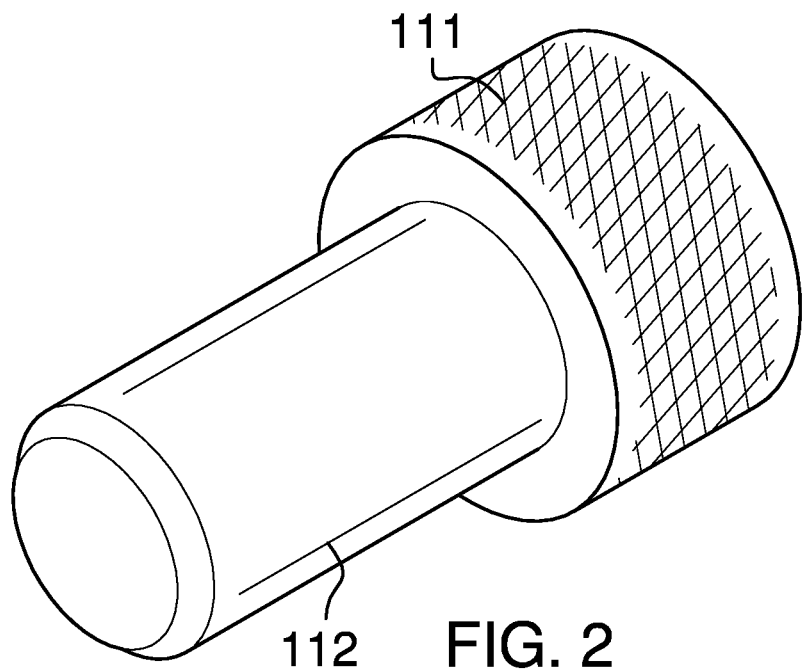
FIG. 2 is a perspective view of an embodiment of the disclosure.
Figure 3:
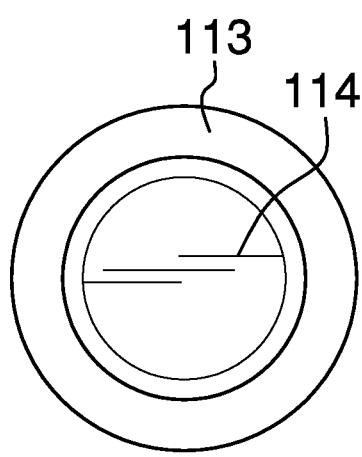
FIG. 3 is a front view of an embodiment of the disclosure.
Figure 4:
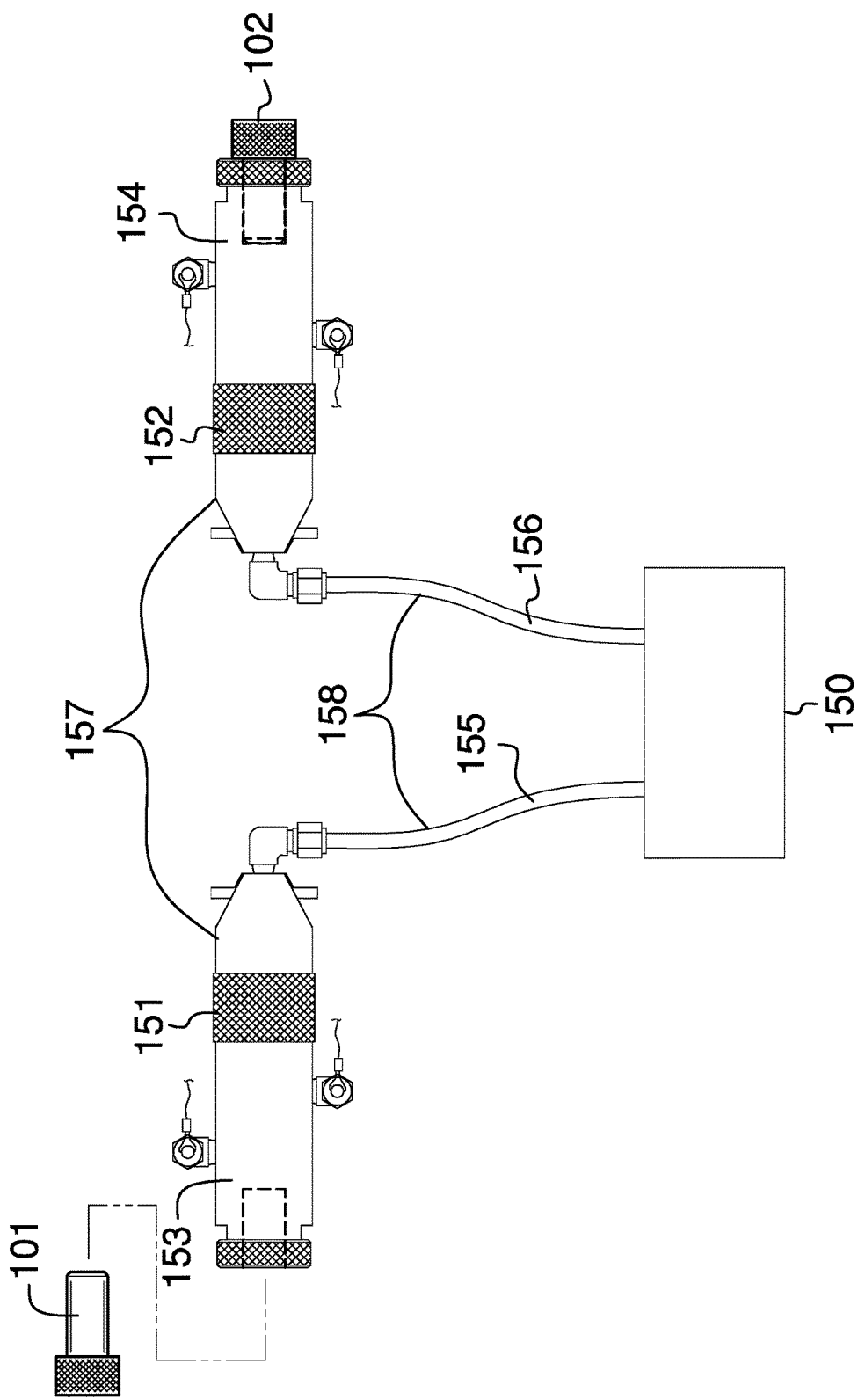
FIG. 4 is an in use view of an embodiment of the disclosure.

Detailed reference will now be made to one or more potential embodiments of the disclosure, which are illustrated in FIGS. 1 through 4.

The pitot-static tester kit 100 (hereinafter invention) comprises a first adapter plug 101, a second adapter plug 102, a cleaning medium 103, a surfactant solution 104, a flashlight 105, a cloth 106, and a sealing tape 107. The invention 100 is adapted for use as a kit. The invention is adapted for use with pitot based measurement equipment. The invention 100 is adapted for use with a stagnation pressure pitot static tube assembly 151. The invention 100 is further adapted for use with a static pressure pitot static tube assembly 152. The stagnation pressure pitot static tube assembly 151 is further defined with a stagnation pressure pitot tube 153 and a stagnation pressure hose 155. The static pressure pitot static tube assembly 152 is further defined with a static pressure pitot tube 154 and a static pressure hose 156. The invention 100 tests the stagnation pressure pitot static tube assembly 151 for leaks in situ. The invention 100 tests the static pressure pitot static tube assembly 152 for leaks in situ. The invention 100 is a kit that simultaneously tests the pitot tube 157 and the hose 158 of a tube assembly selected from the group consisting of the stagnation pressure pitot static tube assembly and the static pressure pitot static tube assembly 152. The selected tube assembly is placed under pressure from an externally provided test set 150 and the invention 100 then tests the pitot tube 157 and the hose 158 of selected tube assembly for leaks.

The first adapter plug 101 comprises a first base 111 and a first stopper 112. The first base 111 is a disk shaped structure. The first stopper 112 is a cylindrical structure that is attached to the first base 111. The first stopper 112 is formed from an elastic material. The outer diameter of the first stopper 112 is greater than the inner diameter of the pitot tube associated with the tube assembly selected from the group consisting of the stagnation pressure pitot static tube assembly 151 and the static pressure pitot static tube assembly 152. The first stopper 112 is sized such that when the first stopper 112 is inserted into the pitot tube of the selected tube assembly, the first stopper 112 compresses thus forming a seal within the pitot tube of the selected tube assembly that is capable of preventing the escape of gas.

The second adapter plug 102 comprises a second base 113 and a second stopper 114. The second base 113 is a disk shaped structure. The second stopper 114 is a cylindrical structure that is attached to the second base 113. The second stopper 114 is formed from an elastic material. The outer diameter of the second stopper 114 is greater than the inner diameter of the pitot tube associated with the tube assembly selected from the group consisting of the stagnation pressure pitot static tube assembly 151 and the static pressure pitot static tube assembly 152. The second stopper 114 is sized such that when the second stopper 114 is inserted into the pitot tube of the selected tube assembly, the second stopper 114 compresses thus forming a seal within the pitot tube of the selected tube assembly that is capable of preventing the escape of gas.

The surfactant solution 104 is a solution wherein water is the solvent and a surfactant is the solute of the solution. The surfactant within the surfactant solution 104 reduces the surface tension of the surfactant solution 104 such that when the surfactant solution 104 is applied to a leak from either the pitot tube 157 and the hose 158 of the tube assembly selected from the group consisting of the stagnation pressure pitot static tube assembly 151 and the static pressure pitot static tube assembly 152 a membrane bubble will be formed. When the membrane bubble is exposed to light from the flashlight 105, the membrane bubble will diffract the light thereby causing a leak to be visible. In the first potential embodiment of the disclosure, the surfactant solution 104 comprises a solution of polyethylene glycol sorbitan monolaurate dissolved in water. The solution concentration of the surfactant solution 104 is between 0.7% and 2.25% (m/m) inclusive. In a second potential embodiment of the disclosure, the surfactant solution 104 further comprises a fluorescent dye in a concentration of between 1% and 3% (m/m). The purpose of the fluorescent dye is to improve the visibility of a leak. Suitable fluorescent dyes include, but are not limited to, dyes of the rhodamine and cyanine classes. The use of rhodamine is preferred because of its solubility properties. Suitable fluorescent dyes within the rhodamine family include, but are not limited to, rhodamine B, rhodamine 6G, or rhodamine 123.

The cleaning medium 103 is a solvent that is used to remove the surfactant solution 104 from the pitot tube and the hose of a selected tube assembly. The cleaning medium 103 is applied to the pitot tube 157 and the hose 158 of the tube assembly selected from the group consisting of the stagnation pressure pitot static tube assembly 151 and the static pressure pitot static tube assembly 152 after testing and allowed to sit for a period of time. The cleaning medium 103 is then removed by wiping the pitot tube 157 and the hose 158 of the selected assembly with the cloth 106. In the first potential embodiment of the disclosure, the cleaning medium 103 is ethylene glycol.

The flashlight 105 is a commercially available handheld light source. The use of an LED light source is preferred. In the second potential embodiment of the disclosure, the flashlight 105 is fitted with an ultraviolet LED such that the ultraviolet radiation will fluoresce the fluorescent dyes within the surfactant solution 104 making a leak more noticeable.

The cloth 106 is a commercially available textile that is used for removing the cleaning medium 103 after it has been applied to the pitot tube 157 and the hose 158 of the tube assembly selected from the group consisting of the stagnation pressure pitot static tube assembly 151 and the static pressure pitot static tube assembly 152.

The sealing tape 107 is a commercially available sealing tape that is used for temporarily marking and plugging leaks found during testing.

To use the invention 100, the stagnation pressure pitot static tube assembly 151 is connected to the externally provided test set 150 and the static pressure pitot static tube assembly 152 is connected to the externally provided test set 150. The first adapter plug 101 is inserted into the stagnation pressure pitot tube 153 and the second adapter plug 102 is inserted into the static pressure tube 155. The stagnation pressure pitot static tube assembly 151 and the static pressure pitot static tube assembly 152 are both coated with the surfactant solution 104. The externally provided test set 150 applies a positive air pressure to the stagnation pressure pitot static tube assembly 151 and the static pressure pitot static tube assembly and the flashlight 105 is shined upon the stagnation pressure pitot static tube assembly 151 and the static pressure pitot static tube assembly 152. When illuminated, the surfactant solution 104 will make any leaks in the stagnation pressure pitot static tube assembly 151 or the static pressure pitot static tube assembly 152 readily visible. Any found leaks are then dealt with. The stagnation pressure pitot static tube assembly 151 and the static pressure pitot static tube assembly 152 are both coated with the cleaning medium 103 and are then wiped clean with the cloth 106.

The following definitions were used in this disclosure:

Cylinder: As used in this disclosure, a cylinder is a geometric structure defined by two identical flat and parallel ends, also commonly referred to as bases, which are circular in shape and connected with a single curved surface wherein when the cross section of the cylinder remains the same from one end to another. The axis of the cylinder is formed by the straight line that connects the center of each of the two identical flat and parallel ends of the cylinder. In this disclosure, the term cylinder specifically means a right cylinder which is defined as a cylinder wherein the curved surface perpendicularly intersects with the two identical flat and parallel ends.

Diode: As used in this disclosure, a diode is a two terminal semiconductor device that allows current flow in only one direction. The two terminals are called the anode and the cathode.

Disk: As used in this disclosure, a disk is a cylindrically shaped object that is flat in appearance.

Elastic: As used in this disclosure, an elastic is a material or object that deforms when a force is applied to it and that is able to return to its original shape after the force is removed. A material that exhibits these qualities is also referred to as an elastomeric material.

In Situ: As used in this disclosure, in situ is used to mean that an object is used as is and requires neither removal nor disassembly.

Inner Diameter: As used in this disclosure, the term inner diameter is used in the same way that a plumber would refer to the inner diameter of a pipe.

Kit: As used in this disclosure, a kit is an assembly of a combination of instruments, equipment, or supplies that are dedicated or intended for use in a specific purpose. Depending on the context, a kit may further include the container within which the instruments, equipment, and supplies are stored.

LED: As used in this disclosure, an LED is an acronym for a light emitting diode. A light emitting diode is a diode that is also a light source.

Outer Diameter: As used in this disclosure, the term outer diameter is used in the same way that a plumber would refer to the outer diameter of a pipe.

Rhodamine: As used in this disclosure, rhodamine is the name of a class of fluorescent dyes.

Rhodamine 123: As used in this disclosure, rhodamine 123 is a name designated to identify the chemical (6-amino-9-(2-methoxycarbonylphenyl)xanthen-3-ylidene]azanium chloride). This designation is consistent with the common usage of rhodamine 123 by those in the chemical and textile arts.

Rhodamine 6G: As used in this disclosure, rhodamine 6G is a name designated to identify the chemical (9-(2-(ethoxycarbonyl)phenyl)-3,6-bis(ethylamino)-2,7-dimethyl-, molybdatesilicate). This designation is consistent with the common usage of rhodamine 6G by those in the chemical and textile arts.

Rhodamine B: As used in this disclosure, rhodamine B is a name designated to identify the chemical [9-(2-carboxyphenyl)-6-diethylamino-3-xanthenylidene]-diethylammonium chloride. This designation is consistent with the common usage of rhodamine B by those in the chemical and textile arts.

Surfactant: As used in this disclosure, a surfactant is a substance that decreases the surface tension of a fluid. Within water, a surfactant often comprises polar and nonpolar functional groups for the purpose of improving the solubility of non-soluble substances in water.

With respect to the above description, it is to be realized that the optimum dimensional relationship for the various components of the invention described above and in FIGS. 1 through 4 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A test kit comprising:
a first adapter plug, a second adapter plug, a cleaning medium, a surfactant solution, a flashlight, a cloth, and sealing tape;
wherein the test kit is adapted for use as a kit;
wherein the test kit is adapted for use with pitot based measurement equipment;
wherein the test kit is adapted for use with a stagnation pressure pitot static tube assembly;
wherein the test kit is further adapted for use with a static pressure pitot static tube assembly;
wherein the stagnation pressure pitot static tube assembly is further defined with a stagnation pressure pitot tube and a stagnation pressure hose;
wherein the static pressure pitot static tube assembly is further defined with a static pressure pitot tube and a static pressure hose;
wherein the test kit tests the stagnation pressure pitot static tube assembly for leaks in situ;
wherein the test kit tests the static pressure pitot static tube assembly for leaks in situ;
wherein the test kit is a kit that simultaneously tests the pitot tube and the hose of a tube assembly selected from the group consisting of the stagnation pressure pitot static tube assembly and the static pressure pitot static tube assembly;
wherein the selected tube assembly is placed under pressure from an externally provided test set;
wherein the test kit tests the pitot tube and the hose of selected tube assembly for a leak;
wherein the first adapter plug comprises a first base and a first stopper;
wherein the first base is a disk shaped structure;
wherein the first stopper is a cylindrical structure;
wherein the first stopper is attached to the first base;
wherein the second adapter plug comprises a second base and a second stopper;
wherein the second base is a disk shaped structure;
wherein the second stopper is a cylindrical structure;
wherein the second stopper is attached to the second base;
wherein the first stopper is formed from an elastic material;
wherein the outer diameter of the first stopper is greater than the inner diameter of the pitot tube associated with the tube assembly selected from the group consisting of the stagnation pressure pitot static tube assembly and the static pressure pitot static tube assembly;
wherein the first stopper is sized such that when the first stopper is inserted into the pitot tube of the selected tube assembly, the first stopper compresses;
wherein the second stopper is formed from an elastic material;

wherein the outer diameter of the second stopper is greater than the inner diameter of the pitot tube associated with the tube assembly selected from the group consisting of the stagnation pressure pitot static tube assembly and the static pressure pitot static tube assembly;

wherein the second stopper is sized such that when the second stopper is inserted into the pitot tube of the selected tube assembly, the second stopper compresses;

wherein the surfactant solution is a solution wherein water is the solvent and a surfactant is the solute of the solution;

wherein the surfactant solution is applied to the pitot tube and the hose of the tube assembly selected from the group consisting of the stagnation pressure pitot static tube assembly and the static pressure pitot static tube assembly;

wherein the surfactant solution creates a membrane bubble when applied to the leak.

2. The test kit according to claim 1 wherein the cleaning medium is applied to the pitot tube and the hose of the tube assembly selected from the group consisting of the stagnation pressure pitot static tube assembly and the static pressure pitot static tube assembly.

3. The test kit according to claim 2 wherein the cleaning medium is ethylene glycol.

4. The test kit according to claim 3 wherein the flashlight is a handheld light source.

5. The test kit according to claim 4 wherein the surfactant comprises polyethylene glycol sorbitan monolaurate.

6. The test kit according to claim 5 wherein the solution concentration of the polyethylene glycol sorbitan monolaurate is between 0.7% and 2.25% (m/m) inclusive.

7. The test kit according to claim 6 wherein the surfactant solution further comprises a fluorescent dye.

8. The test kit according to claim 7 wherein the solution concentration of the fluorescent dye is between 1.0% and 3.0% inclusive.

9. The test kit according to claim 8 wherein the fluorescent dyes is selected from the group consisting of rhodamine B, rhodamine 6G, or rhodamine 123.

10. The test kit according to claim 9 wherein the cloth is a textile.

11. The test kit according to claim 10 wherein the flashlight comprises with an ultraviolet LED.

12. The test kit according to claim 1 wherein the cleaning medium is ethylene glycol.

13. The test kit according to claim 12
wherein the surfactant comprises polyethylene glycol sorbitan monolaurate;
wherein the solution concentration of the polyethylene glycol sorbitan monolaurate is between 0.7% and 2.25% (m/m) inclusive.

14. The test kit according to claim 13
wherein the flashlight is a handheld light source;
wherein the flashlight comprises with an ultraviolet LED;
wherein the cloth is a textile.

* * * * *